(12) United States Patent
Girard et al.

(10) Patent No.: US 8,397,384 B2
(45) Date of Patent: Mar. 19, 2013

(54) METHOD FOR ATTACHING A BEARING SUPPORTING A ROTOR ON A TURBOMACHINE

(75) Inventors: Manuel Claude Bertrand Girard, Vaux le Penil (FR); Jerome Tribouiller, Grenoble (FR)

(73) Assignee: SNECMA, Paris (FR)

( * ) Notice: Subject to any disclaimer, the term of this patent is extended or adjusted under 35 U.S.C. 154(b) by 1168 days.

(21) Appl. No.: 12/265,969

(22) Filed: Nov. 6, 2008

(65) Prior Publication Data

US 2009/0119918 A1 May 14, 2009

(30) Foreign Application Priority Data

Nov. 13, 2007 (FR) ...................................... 07 07941

(51) Int. Cl.
*B21K 25/00* (2006.01)

(52) U.S. Cl. .................. 29/889.2; 29/898.07; 29/898.09; 29/898.1; 29/525.02; 415/142; 415/229; 416/174

(58) Field of Classification Search ................. 29/889.2, 29/889.07, 889.09, 898.1, 525.02, 525.01, 29/898.07, 898.09; 403/335, 336, 337; 415/142, 415/111, 229–231; 416/174; 411/14
See application file for complete search history.

(56) References Cited

U.S. PATENT DOCUMENTS

| 5,701,741 | A | * | 12/1997 | Halsall | ............................. 60/602 |
| 7,316,538 | B2 | * | 1/2008 | Bouchy et al. | ..................... 415/9 |
| 2005/0241290 | A1 | | 11/2005 | Lapergue et al. | |

FOREIGN PATENT DOCUMENTS

| EP | 1 653 051 A1 | 5/2006 |
| JP | 2005-240799 | 9/2005 |
| SU | 703684 | 12/1979 |

* cited by examiner

*Primary Examiner* — Sarang Afzali
(74) *Attorney, Agent, or Firm* — Oblon, Spivak, McClelland, Maier & Neustadt, L.L.P.

(57) ABSTRACT

A method for attaching a bearing on a turbomachine including a stator and a rotor, the bearing including: a first portion attached on the stator of the turbomachine by a plurality of screws and nuts, a second portion attached on the rotor, rotationally movable in one given rotation direction, and a rolling bearing provided between the first and second portions of the bearing is disclosed. The method provides using screws having a screwing rotation direction contrary to the rotation direction of the rotor.

6 Claims, 3 Drawing Sheets

METHOD FOR ATTACHING A BEARING SUPPORTING A ROTOR ON A TURBOMACHINE

TECHNICAL FIELD

This invention relates to attaching a bearing supporting a rotor on a turbomachine.

A turbomachine includes a compressor, a combustion chamber and a turbine. The compressor has a function of increasing the pressure of the air supply to the combustion chamber. The turbine function is to ensure that the compressor is rotationally driven by taking a portion of the pressure energy of the hot gases leaving the combustion chamber and by converting it into mechanical energy.

The compressor and the turbine are both made of a first set of fixed parts, or a stator, and a second set of parts which may be rotated in relation to the stator, or rotor.

The compressor rotor and the turbine rotor form an integral assembly connected by a rotating shaft. The rotor rotation in relation to the stator is made possible by means of bearings, a bearing being a mechanical member supporting and guiding a rotor, particularly the shaft of such rotor. A bearing includes a first portion attached to the stator and a second portion attached to the rotor shaft. A rolling bearing is provided between the two portions of the bearing, thus allowing a portion of the bearing to rotate in relation to the other portion. The rolling bearing may, for example, be of the ball, cylindrical roller or tapered roller type.

PRIOR ART

Attaching the first portion of the bearing on the stator is carried out by flanges provided both on the stator and on the bearing. Such flanges include a plurality of circularly distributed round ports and are attached to each other by clamping by means of a plurality of bolts going through the round ports of the flanges. A bolt is a well-known assembly made of a screw and a nut.

The connection between the flanges should not be lost. In case of the connection being lost, damages on the turbomachine may be devastating and likely to result in the disposal of a great number of parts, even all the turbomachine parts. Indeed, losing the connection, even slightly, may allow the rotor to move downstream the turbomachine and therefore dangerously contact the stator.

Such connection lost may be caused, for example, by a defective clamping of a screw with the corresponding nut. According to studies carried out by the applicant, the connection lost may also be originated by an unbalance having an impact up to the attachment of the above mentioned flanges.

DISCUSSION OF THE INVENTION

The problem addressed by this invention is thus that of improving the attachment of a bearing supporting a rotor on a stator of a turbomachine by making it more reliable and more robust, particularly against a connection lost.

For that purpose, the invention relates to a method for attaching a bearing on a turbomachine comprising a stator and a rotor, the bearing comprising a first portion attached on the stator of the turbomachine by a plurality of screws and nuts, a second portion attached on the rotor, rotationally movable in one given rotation direction, and a rolling bearing provided between the first and second portions of the bearing. According to an essential feature of the invention, the method provides using screws having a screwing rotation direction contrary to the rotation direction of the rotor.

The advantage of a right choice of the screwing direction of the screws is that unscrewing thereof by communication of vibrations due to an unbalance of the rotor of the turbomachine is avoided.

Another advantage of the invention is that such choice allows an auto-screwing of the screws to be achieved thanks to the effects of the rotor unbalance.

BRIEF DESCRIPTION OF THE DRAWINGS

The invention should be better understood, as well as advantages and features thereof by reading the non-limited exemplary description below and referring to the appended drawings wherein.

DETAILED DISCLOSURE OF THE PREFERRED EMBODIMENTS

Figure 1:
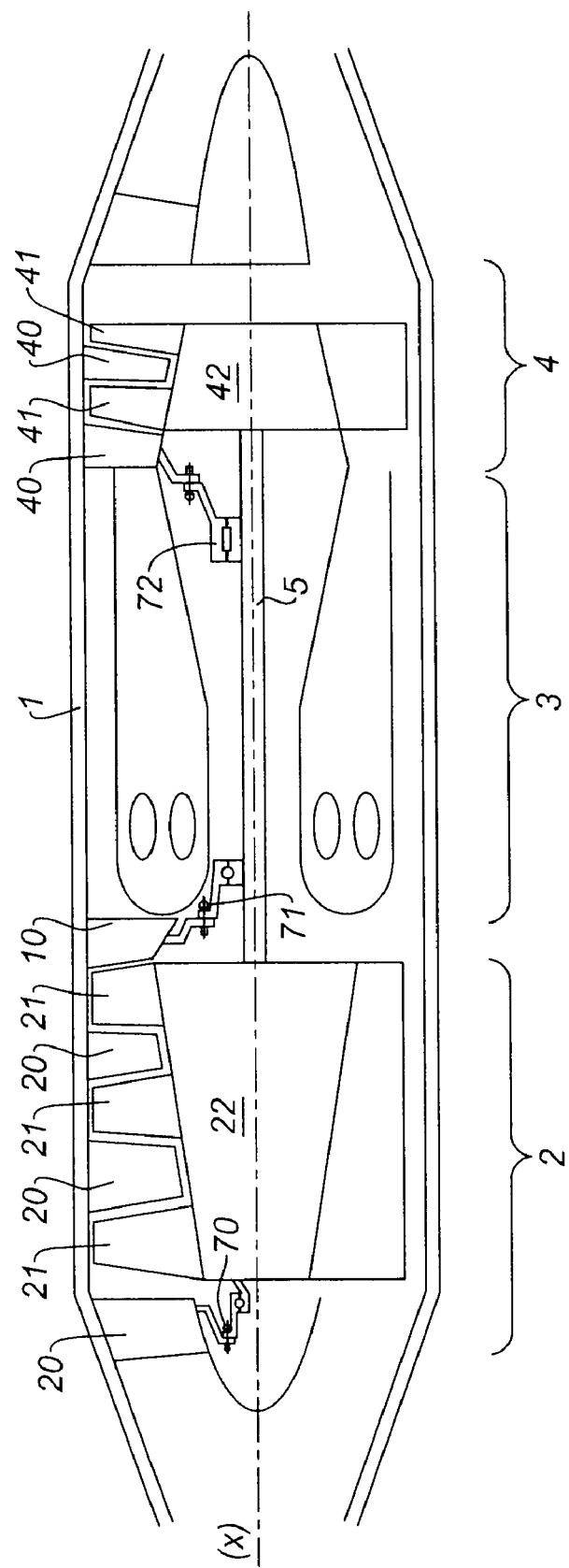
FIG. 1 is a longitudinal section block diagram of a turbomachine.

FIG. 1 schematically shows a turbomachine including a fixed case 1, a compressor 2, a combustion chamber 3 and a turbine 4. The compressor 2 and the turbine 4 both have at least one stage made, on the one hand, of a movable wheel being part of the rotor and, on the other hand, a fixed wheel being part of the stator, each wheel being provided with vanes, which are called "movable vanes" 21 or 41 for the rotor, whether they are on the compressor 2 or on the turbine 4, "downstream guide vanes" 20 on the stator of the compressor 2, and "upstream guide vanes" 40 on the stator of the turbine 4.

The shape of the vanes 20, 21, 40 and 41 and the arrangement thereof in the turbomachine are such that the rotor can only rotate in one operation direction, most often a counter clockwise direction as seen from behind the turbomachine. The rotor 22 of the compressor 2 and the rotor 42 of the turbine 5 are connected by a rotating shaft 5.

Several bearings 70, 71 and 72 allow the rotor to rotate in relation to the stator. The bearings provide an interface between the rotor and the stator. The bearings 70 and 71 are ball bearings and the bearing 72 is a cylindrical roller bearing. According to the turbomachine type, various bearing alternatives may be implemented. They also may be laid out with a different configuration. Such differences have no impact on the invention operation.

Figure 2:
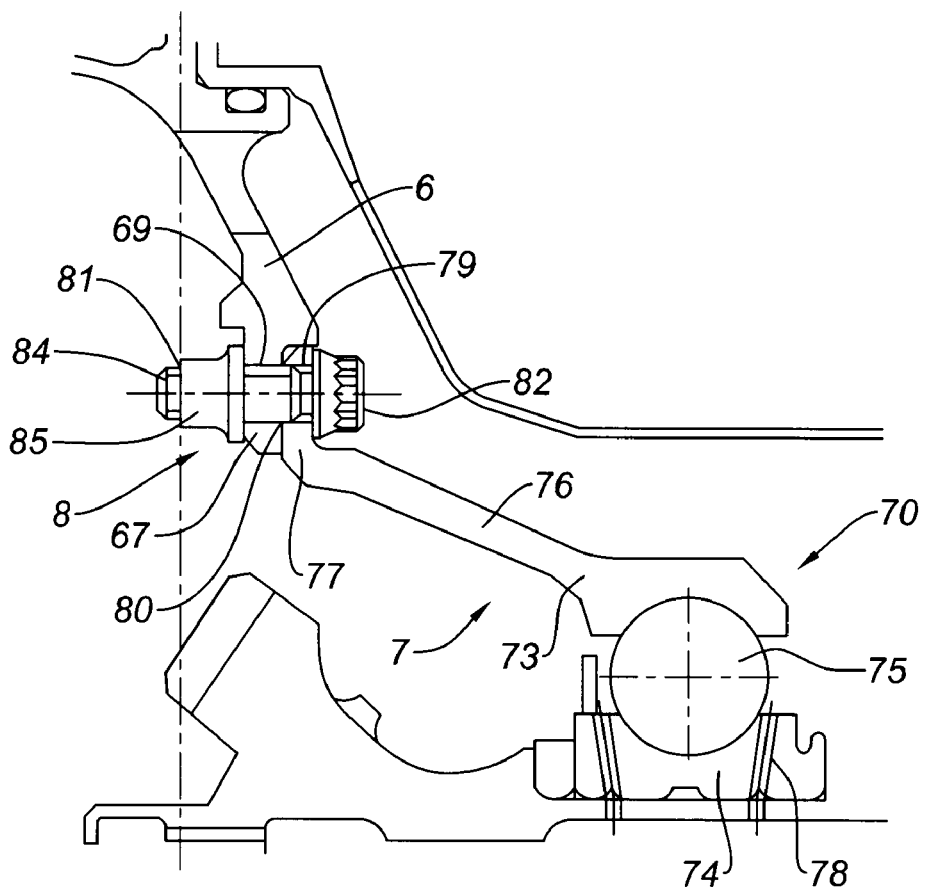
FIG. 2 is a view of a detail of FIG. 1 showing a bearing.

FIG. 2 shows a detailed view of a bearing 7, for example the bearing 71 of FIG. 1, and the surrounding environment thereof. The function of a bearing 7 is to support and guide a rotating part, such as a rotor shaft 5. A bearing 7 includes a first portion 73 and a second portion 74, both portions 73 and 74 being connected by a rolling bearing 70, in this case a ball bearing 75. Lubrication means 78 are provided at this rolling bearing 70.

The first portion 73 of the bearing 7, which has a tapered shape, includes a ring flange 77 which is attached on a ring flange 67 of a tapered part 6 integral with the stator via a middle case 10 connected to the fixed case 1. The flanges 67 and 77 extend parallel to each other in the same radial plan, that is a plan perpendicular to the axis (X) of the turbomachine and the rotation axis (X) of the rotor.

Each flange 67 and 77 includes a plurality of round ports 69 and 79, each round port 69 of the flange 67 of the stator facing a round port 79 of the flange 77 of the bearing 7. The round ports 69 and 79 allow the flanges 67 and 77 to be secured to each other with bolts 8, one bolt 8 being made of a screw 80 and a nut 85. In the example of FIG. 2, the threaded rod 81 of the screw 80 crosses consecutively, from upstream to downstream, the flange 77 of the bearing 7 and the flange 67 of the stator via respective round ports 79 and 69 thereof, with the screw head 82 protruding from the downstream face of the flange 77 and the end 84 of the threaded rod 81 of the screw 80 protruding upstream from the upstream face of the flange 67 of the stator. The nut 85 cooperates with the screw 80 by screwing to the end 84 of the threaded rod 81 of the screw 80, which allows flanges 67 and 77 to be tightened to each other.

Unbalances may form accidentally when the turbomachine is operating, that is during the rotor rotation. An unbalance is an imbalance phenomenon of the rotor, the centre of gravity thereof not being located exactly on the rotation axis as it should be. According to this invention, the unbalance more particularly refers to the portion of the rotor which has a weight overload, thereby causing the imbalance. When a weight imbalance occurs, the centre of gravity is decentred from the rotor axis (X).

In the case of a turbomachine, such unbalance may generate important stresses which are communicated to the flanges 67 and 77, and then transmitted to the bolt 8. Several effects may be caused under such dynamic stresses.

A first effect is a strain of the flanges 67 and 77 which tend to become oval, that is to say a circularity defect of the revolution thereof. This first effect also causes the round ports 69 and 79 on flanges 67 and 77 to become oval.

A second effect is the axial compression of the connection in the peripheral area of the flanges 67 and 77 where the unbalance is located and an axial tension of the related connection in the area opposite to the periphery. Such axial tension stress causes the nut 85 to stick to the upstream face of the flange 67 of the stator. Such sticking tends to prevent the nut 85 from rotating, which nut 85 is thus made to stop in relation to the stator.

Figure 3:
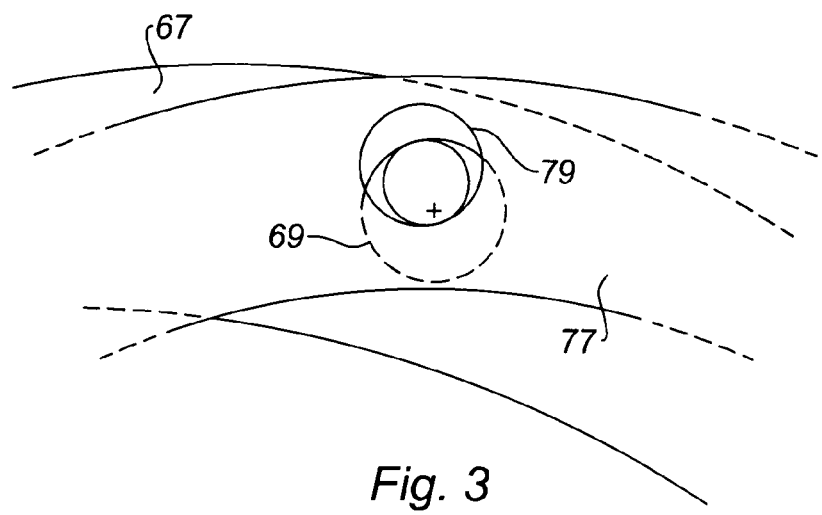
FIG. 3 is a block diagram, in the axis direction from behind, of round ports of the flanges wherein a screw is inserted.
Figure 4:
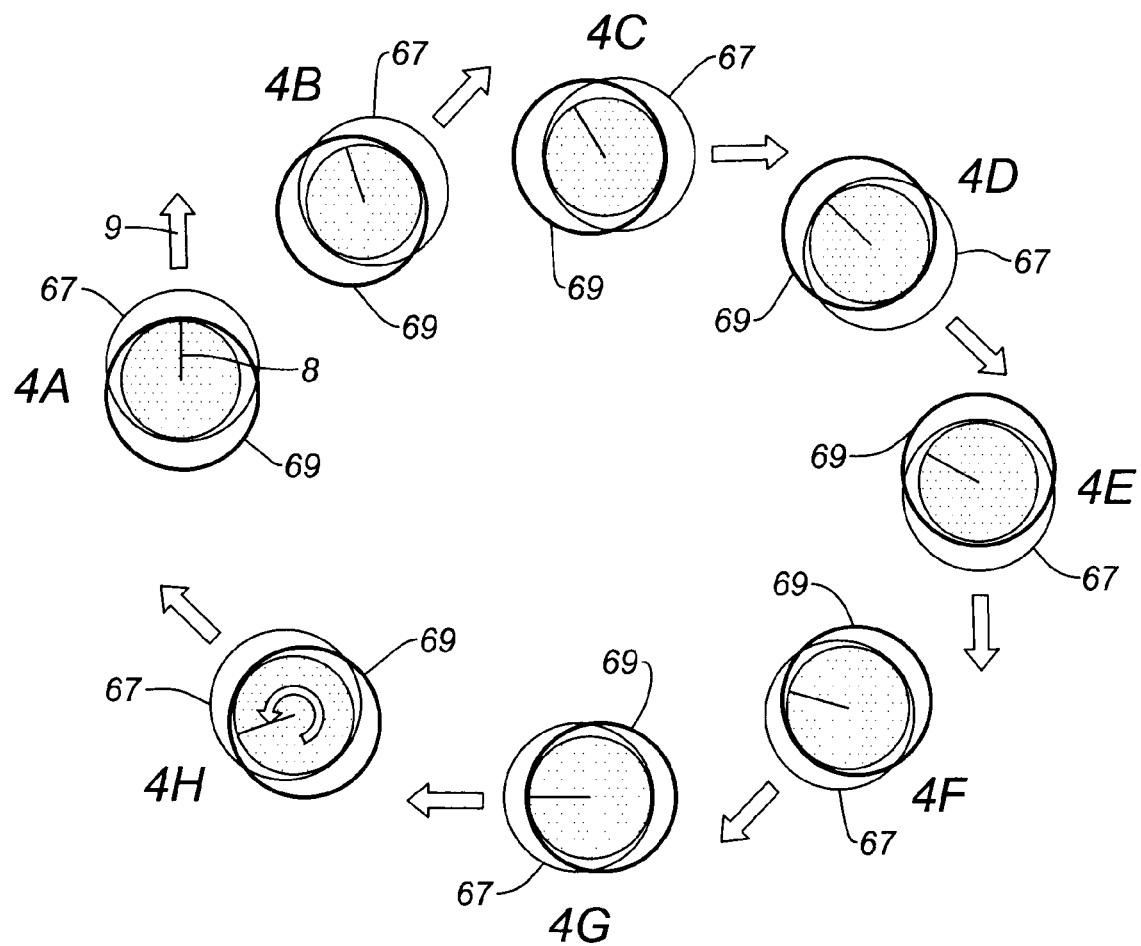
FIGS. 4A to 4H are consecutive block diagrams showing a screw in flanges experiencing the effects of the unbalance, as seen in the axis direction from behind.

A third effect is a relative movement of the flanges 67 and 77 in relation to each other in the radial plan, that is to say that the flanges 67 and 77 slide in relation to each other under the radial stresses. Such movement being generated by the unbalance, the flange 77 of the bearing 7 moves along a circular path around the rotation axis and at the same rotation speed. In addition, each round port 79 of the flange 77 of the bearing 7 also rounds along a circular path around the axis of the round port 69 of the flange 79 of the stator which faces it. When such an effect occurs, the screw 80 is stuck between both flanges 67 and 77, as exaggeratedly shown in FIG. 3. By moving circularly, the flanges 67 and 77 cause a gearing effect between on the one hand the screw 80 and on the other hand the round port 79 of the flange 77 of the bearing 7, which gearing effect tends to rotate the screw 80 in a direction opposite to the rotation direction of the rotor.

The combination of the gearing effect of the flange 79 on the screw 80 and the preventing of the nut 85 from rotating leads to a rotation of the screw 80. Such effect is illustrated in FIGS. 4A to 4H.

FIGS. 4A to 4H show, in a schematic way and as seen from the back, the round ports 69 and 79 of the respective flanges 67 and 77 and the screw 80, more exactly the threaded rod 81 thereof, located between the inner surfaces of the ports 69 and 79. The direction of the unbalance from the screw 80, which unbalance follows the rotation direction of the rotor with the same speed, is shown by the arrow 9. The round port 79 thus makes a circular movement around the axis of the round port 69. The large friction forces between the threaded rod 81 of the screw 80 and the inner surfaces of the round ports 69 and 79, combined to the movement of the flanges 67 and 77 in relation to each other, lead to a rotation movement of the screw 80 around its own axis. The rotation movement of the screw 80 goes counter clockwise, that is to say contrary to the rotation movement of the unbalance and of the rotor which go clockwise, as illustrated by FIGS. 4A to 4H with an angular mark 88 on the screw 80.

Figures 5, 6:
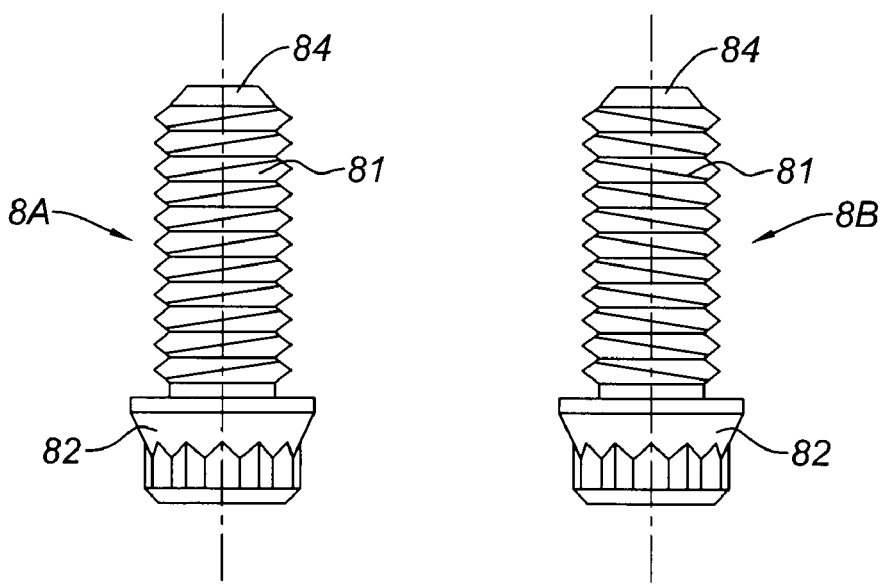
FIG. 5 is a side view of a "right-hand" type screw.
FIG. 6 is a side view of a "left-hand" type screw.

Such rotation movement of the screw 80 along its own axis, in combination to the nut 85 being rotationally locked, may lead to the screw 80 unscrewing when the unscrewing direction thereof corresponds to a counter clockwise rotation, as is the case for the screw 80A shown in FIG. 5. Besides, such unscrewing has a high speed since it is related to the rotation speed of the rotor.

The screw 80A shown in FIG. 5 is a so-called "right-hand screw" because of the right lay-out of the threads, in the screwing direction of the screw 80A, that is to say from the screw head 82 towards the opposite end 84. For the same reasons, the screw 80B of FIG. 6 is a so-called "left-hand screw". However, the right-hand screw 8A is a standard screw and as such is much more widespread in the market, the left-hand screw 8B being rarely, if not never marketed by screw manufacturers.

In order to avoid the unscrewing phenomenon described above, the solution proposed by the invention provides using screws 80 which have a screwing direction contrary to the rotation direction of the rotor. To implement such a solution, two embodiments can be considered.

According to a first embodiment, if a left-hand screw 8A type of bolt is used, the lay-out of the bolt 8 should just be reversed, that is to say by providing the bolt 8 such that the screw head 82 is provided upstream and the end 84 of the threaded rod 81 downstream, contrary to what is shown in FIG. 2. However, because of the mounting sequence of the different parts making up the turbomachine, it may be impossible to freely choose the lay-out of the bolts 8. The second embodiment of the invention provides a solution to this problem.

According to this second embodiment, a left-hand screw 8B type of bolt 8 should be mounted on flanges 67 and 77 instead of the right-hand screw 8A by always laying out the screw head 82 downstream and the end 84 of the threaded rod 81 upstream, as seen in FIG. 2.

In both embodiments of the invention, the rotation of the screw 8, due to counter clockwise rotating unbalance, does not cause the screw to unscrew, indeed a contrary effect is caused, that is screwing the screw 8. Another advantage of the invention is thus the self-screwing of screws 8 thanks to the effects of the rotor unbalance.

The table below is a summary of the type of screws to be used according on the one hand to the clockwise or counter clockwise rotation direction of the rotor, as seen from the back of the turbomachine, and on the other hand to the lay out of the bolt 8, with the nut 85 upstream and the screw head 82 downstream or vice versa, in the turbomachine.

|  |  | Rotor rotation direction | |
|---|---|---|---|
|  |  | Clockwise | Counter clockwise |
| Bolt type | upstream: nut and downstream: screw head | Left-hand screw | Right-hand screw |
|  | downstream: nut and upstream: screw head | Right-hand screw | Left-hand screw |

The invention claimed is:

1. A method for attaching a bearing on a turbomachine comprising a stator and a rotor, the bearing including:
   a first portion attached on the stator of the turbomachine by a plurality of screws and nuts,
   a second portion attached on the rotor of the turbomachine, rotationally movable in one given rotation direction,
   and a rolling bearing provided between the first and second portions of the bearing,
   wherein said method includes using the plurality of screws each having a screwing rotation direction contrary to the rotation direction of the rotor.

2. The method for attaching a bearing on a turbomachine according to claim 1, wherein, when the rotor rotation direction goes clockwise as seen from behind the turbomachine, a head of each screw is located downstream and the corresponding nut is located upstream, and the screws used are left-hand screws.

3. The method for attaching a bearing on a turbomachine according to claim 1, wherein, when the rotor rotation direction goes clockwise as seen from behind the turbomachine, a head of each screw is located upstream and the corresponding nut is located downstream, and the screws used are right-hand screws.

4. The method for attaching a bearing on a turbomachine according to claim 1, wherein, when the rotor rotation direction goes counter clockwise as seen from behind the turbomachine, a head of each screw is located downstream and the corresponding nut is located upstream, and the screws used are right-hand screws.

5. The method for attaching a bearing on a turbomachine according to claim 1, wherein, when the rotor rotation direction goes counter clockwise as seen from behind the turbomachine, a head of each screw is located upstream and the corresponding nut is located downstream, and the screws used are left-hand screws.

6. The method for attaching a bearing on a turbomachine according to any of the preceding claims, wherein the first portion of the bearing comprises a first flange and the stator of the turbomachine comprises a second flange, the first and second flanges being clamped against each other and having respective circular ports with screws therethrough.

* * * * *